Oct. 18, 1932.  E. H. TAYLOR  1,883,094
PIPE FITTING FOR WELDING
Filed Feb. 15, 1932  2 Sheets-Sheet 1
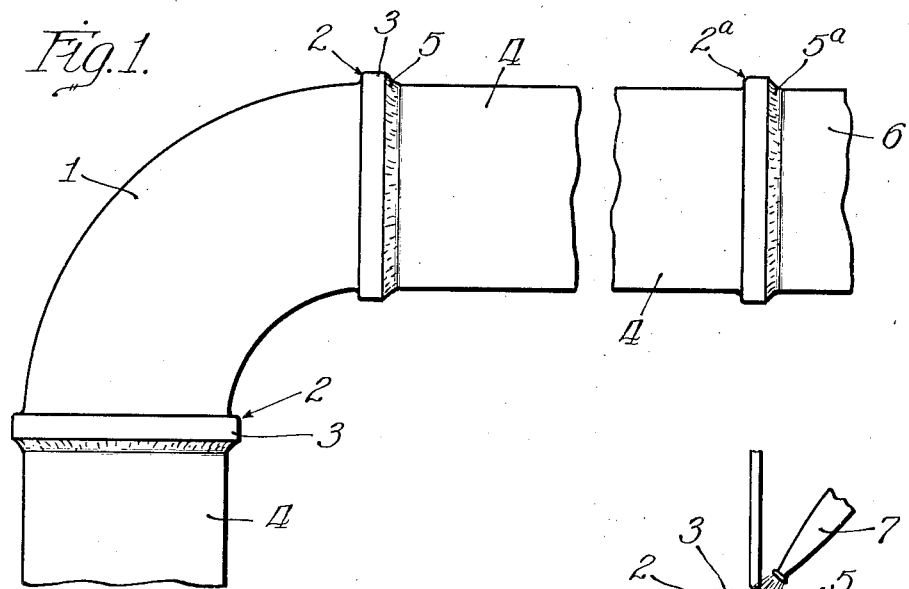
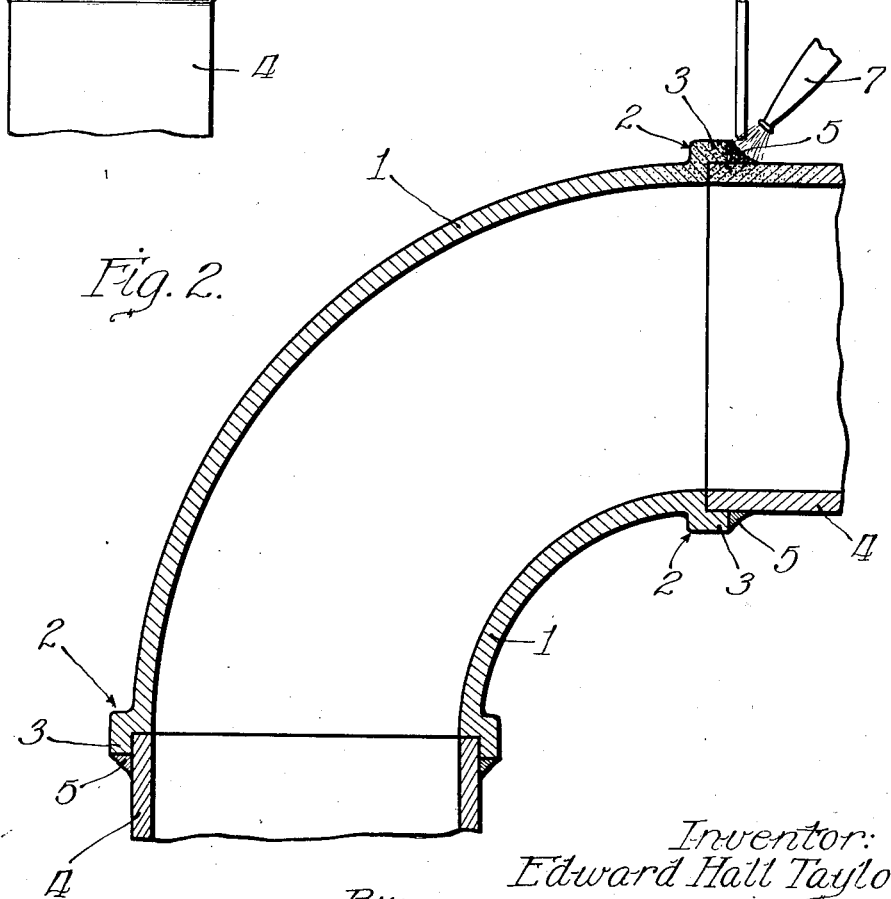
Inventor:
Edward Hall Taylor
By: Brown, Jackson, Boettcher & Dienner.
Atty's.

Oct. 18, 1932.    E. H. TAYLOR    1,883,094
PIPE FITTING FOR WELDING
Filed Feb. 15, 1932    2 Sheets-Sheet 2
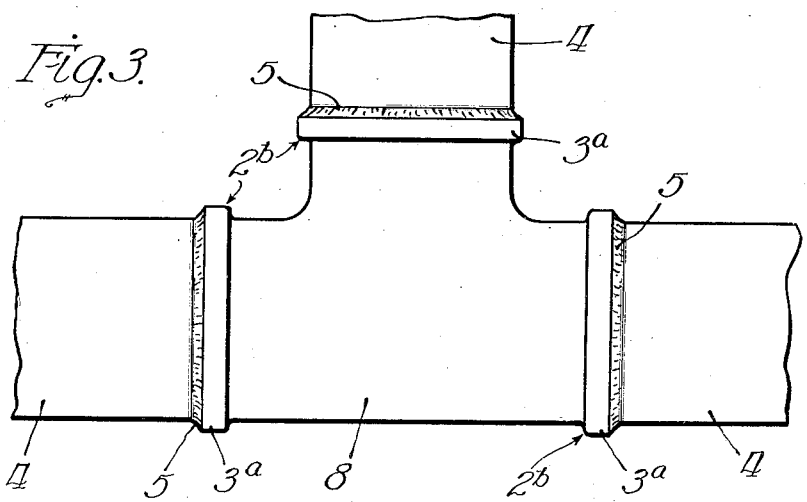
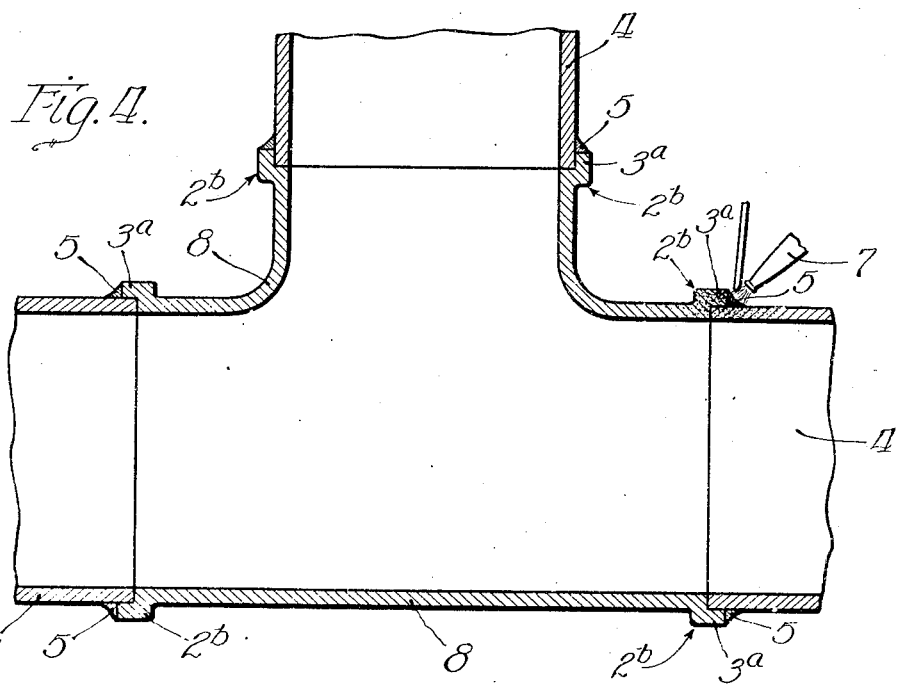
Inventor:
Edward Hall Taylor
By: Brown, Jackson, Boettcher & Dienner.

Patented Oct. 18, 1932

1,883,094

UNITED STATES PATENT OFFICE

EDWARD HALL TAYLOR, OF OAK PARK, ILLINOIS

PIPE FITTING FOR WELDING

Application filed February 15, 1932. Serial No. 593,043.

My invention relates to pipe fittings, and has to do more particularly with a fitting specially adapted for welding to pipe ends and the like.

One of the main objects of my invention is to provide a fitting particularly adapted for welding to pipe ends, this fitting having an element adapted to constitute the overlap of a lap joint and so related to the fitting as to permit of welding thereof to the pipe end expeditiously and without the necessity of exerting unusual care in the welding operation. A further object is to provide a fitting of the character stated which effectively prevents flow of metal and of slag into the piping, incident to the welding operation. It is also an object of my invention to provide a fitting comprising an element adapted to constitute the overlap of a lap joint, such element being so constructed and related to the fitting as to eliminate objectionable stresses during the welding operation. An additional object is to provide a fitting which may be welded to a pipe end with facility by the use of ordinary welding skill, and in the use of which there will be no danger of improper penetration and bonding of the weld. Further objects and advantages of my invention will appear from the detailed description.

In the drawings:—

Figure 1 is an elevation of an elbow in accordance with my invention applied to two pipe ends, this view also illustrating my invention as applied to pipe ends;

Figure 2 is a central sectional view lengthwise through the elbow of my invention and the adjacent pipe ends;

Figure 3 is an elevation of a fitting, in the form of a T, in accordance with my invention and applied to two pipe ends;

Figure 4 is a central sectional view lengthwise through the fitting and pipe ends of Figure 3.

In Figure 2 I have shown an elbow 1 constructed in accordance with my invention. This elbow is preferably formed of wrought metal which is particularly well adapted for welding, and is provided at each end with an outwardly offset socket member 2, in the nature of a collar, the outer portion of which constitutes a flange 3 which is adapted for reception of the end of a pipe 4. The end of pipe 4 and the overlying portion of flange 3 constitute a lap joint, of which flange 3 is the overlap. This flange forms a closure about the end of a pipe 4, which closure is effective to prevent flow of metal and of slag into the piping, during the welding operation.

Member 2 is quite short, preferably as short as possible consistent with mechanical considerations, and flange 3 serves to hold the end of pipe 4 in proper alignment with the end of the elbow during the welding operation. Flange 3 is edge-welded to the immediately adjacent portion of pipe 4 by heating such portion of the pipe, and the edge of flange 3, to welding temperature, and welding additional metal thereto, to provide a weld 5 which unites flange 3 and pipe 4. Any suitable heating means, such as an acetylene torch 7, may be employed. The portion of the end of pipe 4 positioned within flange 3 is quite short and member 2 is heated, during the welding operation and from its edge to a distance somewhat beyond the adjacent end of pipe 4, to a high temperature, which may be appreciably higher than the temperature of the end of the pipe disposed within flange 3. This higher heat of member 2 flows to the pipe end by conduction, and serves to block off flow of heat from the pipe end to member 2. The flow of heat from member 2 to the pipe end and lengthwise of the pipe toward the other end thereof, is prevented or blocked by the higher temperature of the pipe adjacent the edge of flange 3. On the other hand, heat will flow from the highly heated zone of pipe 4, immediately adjacent flange 3, through the pipe and toward the other end thereof, but this dissipation of heat is largely, if not completely, compensated for by the flow of heat from member 2 through the fitting toward the other end thereof. I thus obtain a localized heating effect which assures that the edge of flange 3 and the contiguous portion of pipe 4 are heated to the same temperature, or very nearly so.

This localized heating effect eliminates the necessity of exercising unusual care during the welding operation which may, therefore, be performed much more rapidly than would be the case if the overlap of the joint were of considerable length, that is, extended a considerable distance lengthwise of pipe 4. Furthermore, the lap joint provides a seal about the end of pipe 4, which eliminates possibility of molten metal and of slag flowing into the pipe or the fitting during the welding operation. By constructing the fitting in the particular manner illustrated and described, I render it possible to weld together pipe ends and fittings at comparatively high speed and so as to produce an entirely satisfactory and highly efficient weld therebetween, while eliminating the necessity of employing welders of unusual experience and skill.

A further and important advantage of my invention is that the member 2, including the flange 3, is quite short so that this member, for its entire length, is within the effective zone of stress incident to the welding operation. By the effective zone of stress, I refer to the area within which the metal is subjected to stresses of considerable magnitude, incident to the welding operation, due to expansion and contraction of the metal. During the welding operation, the parts of the joint expand, which expansion is accommodated by slight movement of the collar outwardly throughout its full length, and as the joint contracts as it cools, the collar shrinks about the pipe end. This is advantageous as avoiding subjecting the parts of the joint to excessive stresses, such as would be encountered were the collar 2 extended along pipe 4 to a considerable distance. By avoiding these objectionable stresses, interference with the welding operation from this cause is eliminated, and danger of cracking of either the fitting or the pipe end, due to excessive shrinkage stresses, is obviated, rendering it possible to obtain a continuous weld of great mechanical strength.

Preferably, the length of member 2 its such that this member is disposed, for its entire length, within the effective heating zone of the heating means employed in the welding operation. By the effective heating zone, I refer to the area within which the metal is heated to a sufficiently high temperature, incident to the welding operation, to be rendered more or less plastic so that it will yield readily when subjected to appreciable stresses. This zone is indicated by the stippling in Figures 2 and 4. Having member 2 within the effective heating zone of the heating means is advantageous in that this member, being rendered more or less plastic, is capable of yielding readily to accommodate forces of expansion and contraction. It will thus be seen that, in the preferred form of my invention, the socket member 2 is disposed within both the effective zone of stress and the effective heating zone. However, it is not essential in all cases that socket member 2 be within the effective heating zone, it sufficing in many instances if this member is heated sufficiently to obtain the localized heating effect previously described. In this connection, while it is preferable to heat member 2 to a relatively high temperature, the desired results as to localizing of heat can be accomplished by heating the portion of member 2 which overlaps the pipe end to a temperature either approximately equal to or greater than the temperature to which the underlying portion of the pipe end is heated by conduction through the pipe of heat derived directly from the heating means. On the other hand, it is important that the portion of the socket member 2 which constitutes the overlap of the joint, at least, be within the effective zone of stress of the joint and, preferably, this member should be within such zone for its full length.

In Figure 1 I have shown an elbow, constructed in accordance with my invention, as secured to the ends of two pipes 4. I have also shown one of these pipes as provided, at the end thereof remote from the elbow, with a socket member 2a corresponding to member 2 of the elbow, this member 2a being edge-welded at 5a to the end of an adjacent pipe length 6. It will thus be apparent that my invention, while particularly applicable to pipe fittings, is also capable of being applied to the ends of pipes or pipe lengths, and analogous articles.

While my invention is of great value when applied to curved fittings, such as elbows and the like, it is of even greater value when applied to straight fittings, such as T's, which resist distortion more than curved fittings. In Figures 3 and 4, I have shown a T 8 provided with socket members 2b, including flanges 3a which receive the ends of pipes 4 welded thereto at 5. The construction and use of the T 8 is essentially the same as that of the elbow 1, except that the T offers greater resistance to distortion than the elbow, and need not be further described.

A fitting constructed in accordance with my invention possesses numerous advantages over the various fittings now in use with which I am familiar. It embodies a particular relation and construction of parts which I believe to be new in the art, and which renders possible, for the first time, high speed welding of fittings to pipe ends, thus effecting great economy in welding time, while eliminating possibility of flow of metal and slag into the pipe and fitting, assuring a perfect weld of great strength, and avoiding danger of cracking of the fitting or the pipe end due to unequal shrinkage strains.

It will be noted that in both of the fittings the socket member is off-set radially of the fitting and defines a socket or recess of rectangular cross-section, the face of the shoulder at the inner end of this recess being flat and in a radial plane of the fitting, and the thickness of this shoulder, axially of the fitting, being approximately equal to the thickness of the wall of the body of the fitting. The pipe end fits snugly into the socket and seats flat against the shoulder. This provides an effective closure or seal about the pipe end, which eliminates possibility of flow of slag or metal into the fitting or pipe during the welding operation. A further advantage of constructing the socket member in this manner is that it assures maximum heat conductive contact between the pipe end and the socket member, which contributes to the localized heating effect previously mentioned. A fitting of wrought metal specially adapted for welding, and provided with a socket member constructed in the manner shown and described is highly advantageous, and I believe such a fitting to be new in the art of welding fittings.

It is known in the art to butt-weld together the ends of pipes and pipe fittings by the fusion or puddling process. This method of welding is objectionable since considerable time is consumed in properly aligning and securing the parts before the actual welding together thereof can be started. Also, slag particles will drip through into the piping, and these slag particles cause serious damage to valve seats and valves and other accessories in the piping system or line. In addition, a certain amount of molten metal flows between the ends of the pipes and fittings and chills in the form of globules which produce rounded elements, termed "icicles" by welders, which project into and obstruct the pipe. In order to reduce as far as possible the amount of metal and of slag particles which pass between the ends of pipes and fittings, during the welding operation, it is necessary to employ welders of considerable experience and great care is required to maintain the heat as low as possible consistent with effecting a proper weld, which greatly slows down the welding operation.

There are a great variety of fittings for welding to pipe ends, and fittings formed of alloys and of high tensile strength are coming into use. Such fittings, when butt-welded to pipe ends, in addition to the above noted objections to butt-welding, present the additional problem of cracking from shrinkage. When such a fitting is welded to a pipe end, the fitting and the pipe end expand, under the influence of the heat incident to welding. Upon cooling of the welded joint, unequal shrinkage takes place and sets up severe strains which frequently cause cracking of either the pipe end or the fitting, resulting in leakage and necessitating repairs.

While flow of metal and of slag into the pipe, such as occurs in butt-welding, can be avoided by providing a lap joint of ordinary type between the ends of the pipes and fittings, this joint serving as a seal, the use of such a joint is open to serious objections, from a practical standpoint. In the ordinary lap joint the overlap of the joint is of considerable length and heats much more rapidly than the underlap and the contiguous portion of the pipe end associated therewith, because the heat is rapidly dissipated from the applied heat area toward both ends of the pipe. This renders it difficult to obtain proper heating of the edge of the overlap and the adjacent portion of the pipe end of the underlap to a uniform welding temperature so as to assure an efficient and entirely satisfactory weld therebetween, and there is grave danger of burning away the edge portion of the overlap. This necessitates great care in the welding operation, which must be performed comparatively slowly and by an expert welder of considerable experience. In addition, when this long overlap is heated for welding, the area thereof which is heated to a comparatively high temperature tends to expand, but the expansion of this area is resisted by the relatively cold portions of the overlap fitting about the underlap. As a result, the laps of the joint are subjected to severe stresses which render it difficult to obtain a continuous and entirely satisfactory weld. If the fitting be of an alloy and of high tensile strength, such as above referred to, this difficulty is accentuated and, in addition, breakage of the pipe or of the fitting, upon cooling of the welded joint, due to shrinkage strains, is practically inevitable.

A butt-weld has certain disadvantages, as already pointed out. A lap weld of ordinary type overcomes some of these disadvantages, but it in turn possesses other disadvantages which are so great that the butt-weld is used on practically all pipe fitting welding work.

In addition to the danger of burning away the edge of the overlap, in a lap weld of ordinary type, there is the danger of incompetent welders making what appears to be a good weld, but the weld being actually a very weak one, due to not sufficient heat being transmitted to the underlap to assure proper penetration and bonding of the weld metal. This fact, probably more than any other one, has caused contractors and engineers to prefer the butt-welded type of joint even with its many disadvantages, for in a butt type of joint there is not the danger of having a perfect appearing weld and yet the weld having no strength. A weld, having proper appearance of strength, yet improper bonding of metal, can cause serious consequences when used on high pressure high temperature steam service and the utmost care must be used with lap welds of ordinary type to assure perfect bonding to the underlap.

Briefly, the advantages obtained by the fitting and joint of my invention are as follows:—

Better installations of piping systems are obtained, as they are free from slag and restrictions to flow.

Faster erection of pipe systems is obtained, for the lining up time, which is a large proportion of the total time, is eliminated, as the fittings line themselves up.

The welding time is reduced, as it is possible to use greater heat than in a butt-weld, or in a lap weld of ordinary type, and the heat is localized where it makes the fastest weld.

Faster erection and welding time reduce the cost of piping systems.

In addition to the above, greater safety is obtained for the weld does not require a high degree of skill and there is not the danger of improper penetration of heat resulting in a good appearing, yet weak weld.

Also, when welding higher carbon or alloy steel pipe the flexibility of the short welding flange or lip provides for sufficient relief from the strains incident to the welding operation to prevent cracking of the joint.

What I claim is:—

As a new article of manufacture, a weldable pipe fitting having its wall offset outwardly near its end to form a shallow socket directly open to the interior of the fitting and providing a shoulder, said socket being adapted to receive the straight end portion of a weldable pipe so that the end of said pipe directly abuts said shoulder throughout a substantial area and the interior surface of said pipe forms from its end a direct continuation of the interior surface of said fitting, the depth of said socket being so proportioned to the thickness of the engaging fitting and pipe walls that the heat of fusion welding applied to the end of the fitting and the adjacent outer surface of the pipe is conducted therefrom at substantially equal rates in either direction to provide for substantially equal heating of such weld-receiving end and surface.

In witness whereof, I hereunto subscribe my name this 10th day of February, 1932.

EDWARD HALL TAYLOR.